US008892676B2

(12) United States Patent
Aszmann et al.

(10) Patent No.: US 8,892,676 B2
(45) Date of Patent: Nov. 18, 2014

(54) THIN IMPORT FOR A DATA STORAGE SYSTEM

(75) Inventors: Lawrence E. Aszmann, Prior Lake, MN (US); Michael J. Klemm, Minnetonka, MN (US)

(73) Assignee: Compellent Technologies, Eden Prairie, MN (US)

( * ) Notice: Subject to any disclaimer, the term of this patent is extended or adjusted under 35 U.S.C. 154(b) by 0 days.

(21) Appl. No.: 12/614,815

(22) Filed: Nov. 9, 2009

(65) Prior Publication Data
US 2010/0121937 A1 May 13, 2010

Related U.S. Application Data

(60) Provisional application No. 61/112,446, filed on Nov. 7, 2008.

(51) Int. Cl.
G06F 15/167 (2006.01)
G06F 7/00 (2006.01)
G06F 13/00 (2006.01)
G06F 3/06 (2006.01)
G06F 11/14 (2006.01)
H04L 29/08 (2006.01)
G06F 11/20 (2006.01)

(52) U.S. Cl.
CPC ............ G06F 3/0608 (2013.01); G06F 3/0655 (2013.01); G06F 11/1448 (2013.01); G06F 3/067 (2013.01); G06F 3/0647 (2013.01); G06F 3/0613 (2013.01); H04L 67/1097 (2013.01); G06F 11/2056 (2013.01); H04L 67/1095 (2013.01)
USPC ............ 709/213; 707/610; 707/640; 711/161

(58) Field of Classification Search
CPC ............................ G06F 3/0646–3/0661; G06F 11/1446–11/1469; G06F 2056/2087; G06F 17/30079; H04L 67/1095–67/1097
USPC .......... 709/212–219, 246–248; 711/100–173; 707/609–673, 822–827
See application file for complete search history.

(56) References Cited

U.S. PATENT DOCUMENTS

| | | | |
|---|---|---|---|
| 5,274,807 A | 12/1993 | Hoshen et al. | |
| 6,073,221 A | 6/2000 | Beal et al. | |
| 6,366,987 B1 * | 4/2002 | Tzelnic et al. | 711/162 |
| 7,225,314 B1 * | 5/2007 | Bonwick et al. | 711/170 |
| 7,293,154 B1 * | 11/2007 | Karr et al. | 711/202 |
| 7,831,639 B1 * | 11/2010 | Panchbudhe et al. | 707/816 |
| 8,316,196 B1 * | 11/2012 | Mullis et al. | 711/162 |
| 2002/0073278 A1 * | 6/2002 | McDowell | 711/114 |
| 2004/0088505 A1 * | 5/2004 | Watanabe | 711/161 |
| 2006/0104347 A1 * | 5/2006 | Callan et al. | 375/240.01 |
| 2006/0150190 A1 * | 7/2006 | Gusler et al. | 718/105 |
| 2007/0180306 A1 | 8/2007 | Soran et al. | |
| 2009/0083563 A1 * | 3/2009 | Murase | 713/324 |
| 2009/0150897 A1 * | 6/2009 | Chen et al. | 718/104 |
| 2009/0216972 A1 * | 8/2009 | Deguchi et al. | 711/162 |

(Continued)

*Primary Examiner* — Patrice Winder
*Assistant Examiner* — Julian Chang
(74) *Attorney, Agent, or Firm* — Winthrop & Weinstine, P.A.

(57) ABSTRACT

The present disclosure relates to systems and methods for migrating data from one data storage system to another data storage system. A method can include copying data from one data storage system to another data storage system wherein data stored in data address locations of the first data storage system containing a NULL or zero is excluded from being written to the second data storage system.

16 Claims, 2 Drawing Sheets

(56) References Cited

U.S. PATENT DOCUMENTS

| | | | |
|---|---|---|---|
| 2010/0186014 A1* | 7/2010 | Vaghani et al. | 718/101 |
| 2010/0205390 A1* | 8/2010 | Arakawa | 711/162 |
| 2010/0205392 A1* | 8/2010 | Schnapp et al. | 711/162 |
| 2010/0257402 A1* | 10/2010 | Kurita | 714/7 |
| 2010/0262585 A1* | 10/2010 | Rosikiewicz et al. | 707/679 |
| 2010/0262586 A1* | 10/2010 | Rosikiewicz et al. | 707/679 |
| 2010/0262797 A1* | 10/2010 | Rosikiewicz et al. | 711/162 |
| 2010/0299491 A1* | 11/2010 | Ueda | 711/162 |
| 2013/0024642 A1* | 1/2013 | Flynn et al. | 711/170 |

* cited by examiner

THIN IMPORT FOR A DATA STORAGE SYSTEM

FIELD OF THE INVENTION

The present invention generally relates to importing data to a disk drive or data storage system, and more particularly to systems and methods for thin import of data to a disk drive or data storage system.

BACKGROUND OF THE INVENTION

Oftentimes, a need or desire may arise to transfer data from one disk drive or data storage system to another disk drive or data storage system. In prior data migration methods, along with address locations having meaningful data, empty address locations are transferred to the latter disk drive or data storage system taking up what can often be valuable storage space.

Thus, there exists a need in the art for systems and methods for thin import of data to a disk drive or data storage system, wherein during data migration, data address locations having a NULL or zero may not be imported to, or otherwise copied to, the receiving data storage system.

BRIEF SUMMARY OF THE INVENTION

The present disclosure, in one embodiment, relates to a method for migrating data from one data storage system to another data storage system. The method may include copying data from one data storage system to another data storage system wherein data stored in data address locations of the first data storage system containing a NULL or zero is excluded from being written to the second data storage system.

The present disclosure, in another embodiment, relates to a software program for migrating data from a first data storage system to a second data storage system. The software program may include code for migrating data stored on a data address location on the first data storage system to a data address location on the second data storage system based on a determination of whether the data stored at the data address location on the first data storage system indicates that data address location is empty.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

The present disclosure relates to novel and advantageous systems and methods importing data to a disk drive or data storage system, and more particularly to novel and advantageous systems and methods for thin import of data to a disk drive or data storage system. Generally, the present disclosure relates to various embodiments of systems and methods for importing data to a disk drive or data storage system wherein data stored on the exporting disk drive or data storage system may be efficiently imported to a receiving disk drive or data storage system. Rather than merely copying all data locations from the exporting disk drive or data storage system, the present disclosure relates to systems and methods wherein data addresses containing NULL or zeros (0) may not be imported to the receiving disk drive or data storage systems. This may be referred to herein as "thin import;" although the term "thin import" is not meant to be limiting in any manner.

A disk drive or data storage system may hereinafter be referred to as a "data storage system." A data storage system can include a single disk drive or a plurality of disk drives. A data storage system can include a RAID subsystem, for example but not limited to, having a combination of at least one of RAID types, such as RAID-0, RAID-1, RAID-5, and RAID-10. It will be appreciated that other RAID types can be used in alternative RAID subsystems, such as RAID-3, RAID-4, RAID-6, and RAID-7, etc. A data storage system may be similar to the systems (and employ the methods) disclosed and claimed in U.S. Pat. No. 7,398,418, U.S. Pat. No. 7,404,102, U.S. patent application Ser. No. 10/918,329, U.S. patent application Ser. No. 11/689,847, and U.S. patent application Ser. No. 11/689,899, each of which is hereby incorporated herein by reference in its entirety.

Figure 1:
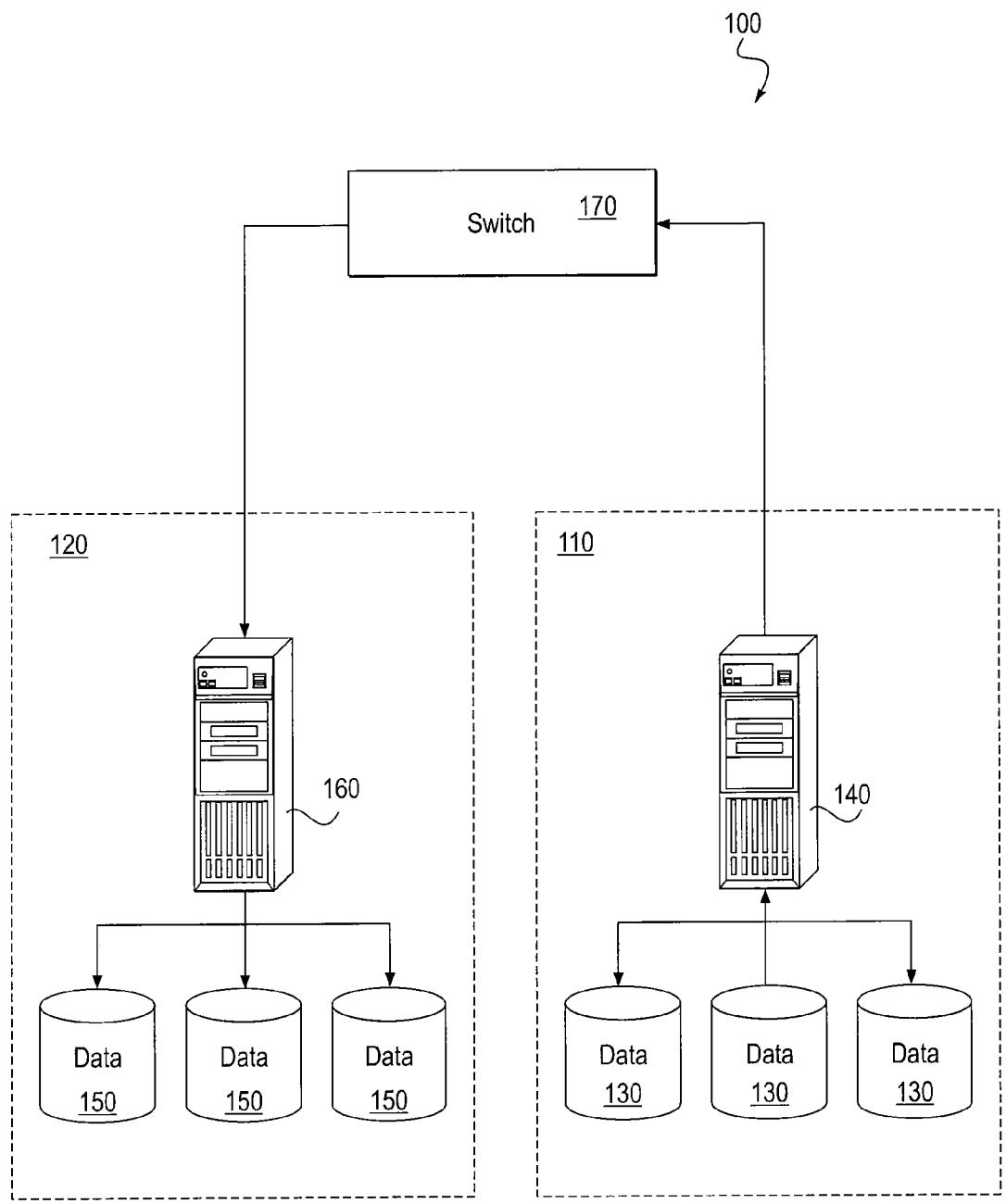
FIG. 1 is a schematic of an environment for thin import according to one embodiment of the present disclosure.

FIG. 1 illustrates one embodiment of an environment for thin import 100. The environment 100 may include an exporting or first data storage system 110 and an importing, receiving, or second data storage system 120. The exporting data storage system 110 may include one or more data stores 130, such as but not limited to disk drives for storing data. In some embodiments, the exporting data storage system 110 may include a RAID subsystem. A server or data manager/controller 140 may manage the data stored on data stores 130. The data manager 140 may manage the data stored on data stores 130 by, for example but not limited to, controlling access to the data, managing reads from and writes to the data stores, reorganizing the data stored on the data stores, etc. The importing data storage system 120 may also include one or more data stores 150, such as but not limited to disk drives for storing data. In some embodiments, the exporting data storage system 120 may include a RAID subsystem. A server or data manager/controller 160 may manage the data stored on data stores 150. The data manager 160 may manage the data stored on data stores 150 by, for example but not limited to, controlling access to the data, managing reads from and writes to the data stores, reorganizing the data stored on the data stores, etc. In further embodiments, the importing data storage system 120 may be similar to the systems (and employ the methods) disclosed and claimed in U.S. Pat. No. 7,398,418, U.S. Pat. No. 7,404,102, U.S. patent application Ser. No. 10/918,329, U.S. patent application Ser. No. 11/689, 847, and U.S. patent application Ser. No. 11/689,899, each of which was previously incorporated herein by reference. In other embodiments, the exporting data storage system 110, importing storage system 120, and/or both systems 110, 120 may be similar to the systems (and employ the methods) disclosed and claimed in U.S. Pat. No. 7,398,418, U.S. Pat. No. 7,404,102, U.S. patent application Ser. No. 10/918,329, U.S. patent application Ser. No. 11/689,847, and U.S. patent application Ser. No. 11/689,899.

In one embodiment, the exporting data storage system 110 may be communicatively connected to the importing data storage system 120 directly or over a network, such as a LAN, WAN, such as the Internet, etc. In one embodiment, the exporting data storage system 110 may be communicatively connected to the importing data storage system 120 through a switch 170 or other similar device or network node. The switch 170 may direct and/or control the flow of data from the exporting data storage system 110 to the importing data storage system 120.

The environment 100 shown in FIG. 1 is illustrative only, and it is recognized that an environment for thin import 100 according to the present disclosure may include any number of exporting data storage systems and/or importing data storage systems. Each of the data storage systems may be communicatively connected directly or over a network, such as a LAN, WAN, such as the Internet, etc., as described above.

Generally, data may be imported from the exporting data storage system 110 to the importing data storage system 120 so that the importing data storage system 120 can be used as a new or additional data storage system for managing the respective data. In some embodiments, the importing data storage system 120 may become the new and sole system, an additional system, a primary data system, a back-up or secondary system, etc. In one embodiment, the environment 100 illustrated in FIG. 1 may be used to migrate data from the exporting data storage system 110 to the importing data storage system 120.

Oftentimes, empty data address locations of the data stores 130 of the exporting data storage system 110 may be indicated by storing a NULL or zero (0) in each of those data address locations. According to one embodiment of the present disclosure, during data migration from the exporting data storage system 110 to the importing data storage system 120, data address locations having a NULL or zero (0) may not be imported to, or otherwise copied to, the data stores 150 of the importing data storage system 120.

Figure 2:
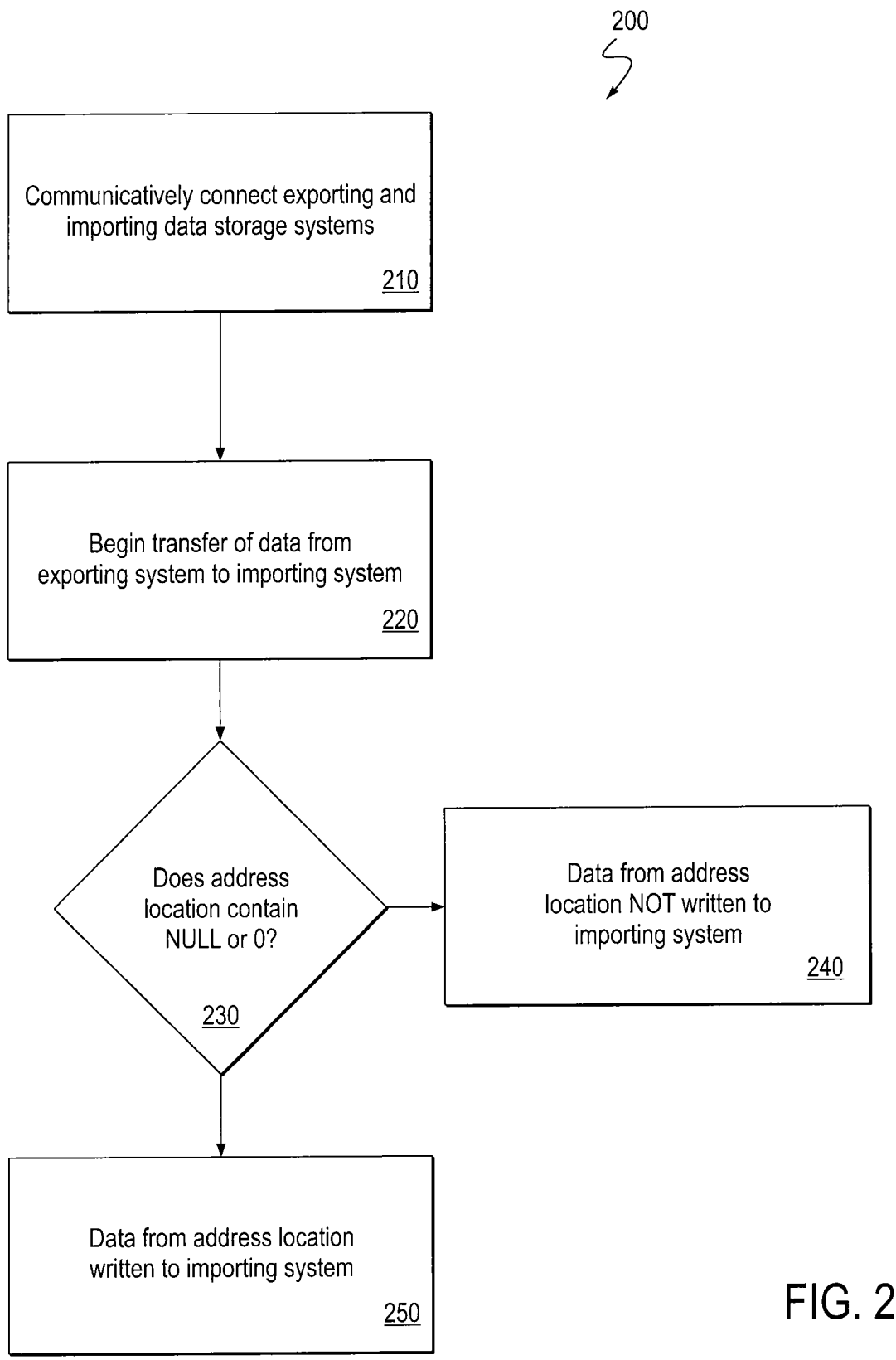
FIG. 2 is flow diagram of a method for thin import according to one embodiment of the present disclosure.

As stated above, systems and methods for thin import may be used to migrate data from one data storage system to another. FIG. 2 illustrates one embodiment of a method for thin import 200 according to the present disclosure. In step 210, the migration of data from one data storage system to another may be initiated by communicatively connecting an exporting data storage system to an importing data storage system. As stated above, the exporting data storage system may be communicatively connected to the importing data storage system directly or over a network, such as a LAN, WAN, such as the Internet, etc. In step 220, data stored on the data stores of the exporting data storage system may begin to be transferred, or otherwise copied, to the data stores on the importing data storage system. In step 230, if it is determined that a data address location of the data stores of the exporting data storage system contains a NULL or zero (0), then in step 240, that address location may not be written to, or otherwise copied to, the data stores of the importing data storage system. The data in the address locations containing a NULL or zero (0) can be discarded, ignored, or the like. If, on the other hand, it is determined that a data address location of the data stores of the exporting data storage system does not contain a NULL or zero (0), then in step 250, the data may be written, or otherwise copied, to the data stores on the importing data storage system. In some embodiments, the software and/or hardware that can be used for determining whether a data address location of the data stores of the exporting data storage system contains a NULL or zero (0) in systems and methods for thin import according to the present disclosure may be located at the importing data storage system or operably connected to the importing data storage system. In a further embodiment, the importing data storage system may be similar to the systems (and employ the methods) disclosed and claimed in U.S. Pat. No. 7,398,418, U.S. Pat. No. 7,404,102, U.S. patent application Ser. No. 10/918,329, U.S. patent application Ser. No. 11/689,847, and U.S. patent application Ser. No. 11/689,899, and the data transferred, or otherwise copied, from the exporting data storage system may be stored in the data stores of the importing storage system according to the methods disclosed in the above-identified patents and patent applications, including the use of, among other things, data allocation, data progression, instant data fusion, and data instant replay.

Although the present invention has been described with reference to preferred embodiments, persons skilled in the art will recognize that changes may be made in form and detail without departing from the spirit and scope of the invention.

We claim:

1. A method for migrating data from a first data storage system to a second data storage system, comprising:
   transferring data from a plurality of data address locations of the first data storage system to the second data storage system, wherein a portion of the data address locations are empty, having NULL or zero data; and
   at the second data storage system, determining, by directly reading from the data address locations of the transferred data, whether any data address location of the transferred data comprises NULL or zero data and copying data to data stores of the second data storage system, based on the determination of whether any data address location of the transferred data comprises NULL or zero data, such that the NULL or zero data is excluded from being copied to the data stores.

2. The method of claim 1, wherein either or both the first and second data storage systems comprise a RAID subsystem.

3. The method of claim 1, further comprising communicatively connecting the first and the second data storage systems over a network.

4. The method of claim 3, wherein the network comprises a LAN, WAN, Internet, or combination thereof.

5. The method of claim 3, wherein the communicative connection over the network further comprises a switch or a network node configured to direct or control data flow from the first data storage system to the second data storage system.

6. The method of claim 1, wherein the first data storage system is a primary data storage system and the second data storage system is a back-up or secondary data storage system.

7. The method of claim 1, wherein the relative data address locations of the portions of the transferred data that are determined as comprising NULL or zero data are not copied at the data stores at the second data storage system.

8. A system for migrating data, comprising:
   a first data storage system comprising data stored in a plurality of data address locations wherein a portion of the data address locations are empty, having NULL or zero data; and
   a second data storage system comprising:
      a data store defined by a plurality of data address locations; and
      a data manager operatively connected to the first data storage system and configured to receive data transferred from the plurality of data address locations of the first data storage system, determine, by directly reading from the data address locations of the transferred data, whether any data address location of the transferred data comprises NULL or zero data, and copy data to data stores of the second data storage system, based on the determination of whether any data address location of the transferred data comprises NULL or zero data, such that the NULL or zero data is excluded from being copied to the data stores.

9. The method of claim 8, wherein either or both the first and second data storage systems comprise a RAID subsystem.

10. The system of claim 8, wherein the first data storage system and the data manager are communicatively connected over a network.

11. The system of claim 10, wherein the network comprises a LAN, WAN, Internet, or combination thereof.

12. The system of claim 10, further comprising a switch or a network node configured to direct or control data flow from the first data storage system to the data manager.

13. The system of claim 8, wherein the first data storage system is a primary data storage system and the second data storage system is a back-up or secondary data storage system.

14. The system of claim 8, wherein the relative data address locations of the portions of the transferred data that are determined as comprising NULL or zero data are not copied at the data stores at the second data storage system.

15. A computer software program stored on a non-transitory computer-readable storage medium for copying data from a first data storage system to a second data storage system, the program comprising computer-implementable code configured to:
 transfer data from a plurality of data address locations of the first data storage system to the second data storage system, wherein a portion of the data address locations are empty, having NULL or zero data; and
 at the second data storage system, determining, by directly reading from the data address locations of the transferred data, whether any data address location of the transferred data comprises NULL or zero data and copying data to data stores of the second data storage system, based on the determination of whether any data address location of the transferred data comprises NULL or zero data, such that the NULL or zero data is excluded from being copied to the data stores.

16. The computer software program of claim 15, wherein at least one of the first and second data storage systems comprises a RAID subsystem.

\* \* \* \* \*